(12) United States Patent
Yabune et al.

(10) Patent No.: US 9,618,115 B2
(45) Date of Patent: Apr. 11, 2017

(54) COMBINED OIL CONTROL RING

(71) Applicant: KABUSHIKI KAISHA RIKEN, Tokyo (JP)

(72) Inventors: Hiroyuki Yabune, Kashiwazaki (JP); Masaaki Fujita, Kashiwazaki (JP); Hiroyuki Sugihara, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 219 days.

(21) Appl. No.: 14/255,488

(22) Filed: Apr. 17, 2014

(65) Prior Publication Data

US 2015/0167844 A1 Jun. 18, 2015

(30) Foreign Application Priority Data

Dec. 18, 2013 (JP) ................ 2013-260819

(51) Int. Cl.
*F16J 9/00* (2006.01)
*F16J 9/06* (2006.01)

(52) U.S. Cl.
CPC ............. *F16J 9/065* (2013.01); *F16J 9/068* (2013.01)

(58) Field of Classification Search
CPC ............................................. F16J 9/00–9/203
See application file for complete search history.

(56) References Cited

U.S. PATENT DOCUMENTS

| | | | | |
|---|---|---|---|---|
| 2,904,377 A * | 9/1959 | Endres | ...................... | F16J 9/068 267/1.5 |
| 2,967,746 A * | 1/1961 | Braendel | .................. | F16J 9/068 277/480 |
| 4,585,237 A * | 4/1986 | Koop | ....................... | F16J 9/068 267/1.5 |
| 5,619,795 A * | 4/1997 | Miyoshi | ................... | F16J 9/068 29/888.01 |
| 7,243,596 B2 * | 7/2007 | Usui | ........................ | F16J 9/068 277/473 |
| 7,854,191 B2 * | 12/2010 | Kariya | ..................... | F16J 9/067 92/160 |
| 2006/0061043 A1 | 3/2006 | Takahashi et al. | | |

FOREIGN PATENT DOCUMENTS

| | | |
|---|---|---|
| JP | 56-66429 A | 6/1981 |
| JP | 2000-27995 A | 1/2000 |
| JP | 2003-286898 A | 10/2003 |
| JP | 2006-292021 A | 10/2006 |
| WO | WO 2005/040645 A1 | 5/2005 |

OTHER PUBLICATIONS

European Office Action, issued Aug. 21, 2014, for European Application No. 14165147.1.
European Office Communication and Search Report, issued Aug. 5, 2014, for European Application No. 14165147.1.

* cited by examiner

*Primary Examiner* — Vishal Patel
(74) *Attorney, Agent, or Firm* — Birch, Stewart, Kolasch & Birch, LLP

(57) ABSTRACT

A combined oil control ring comprising a pair of circular side rails each having a gap, and a waved spacer expander longitudinally sandwiched by the side rails, which has seating tabs for pushing inner surfaces of the side rails on the inner side, (a) the radial thickness $a_1$ of the side rail being 50-90% of the height $a_9$ of the spacer expander, or (b) the height $a_{10}$ of the seating tab being 23-60% of the height $a_9$ of the spacer expander.

8 Claims, 1 Drawing Sheet

COMBINED OIL CONTROL RING

FIELD OF THE INVENTION

The present invention relates to a combined oil control ring comprising a pair of circular side rails and a spacer expander, which has improved followability to a cylinder wall surface with reduced oil consumption.

BACKGROUND OF THE INVENTION

To prevent global warming, the reduction of $CO_2$ emission has recently been required, so that improvements in fuel efficiency and combustion efficiency in automobile engines have been pursued. Particularly, to improve fuel efficiency, improvements have been made to reduce friction in sliding members of pistons. The tension reduction of piston rings is important to achieve friction reduction. Because the tension of an oil control ring occupies 50% or more of the total tension of all piston rings, the reduction of its tension is significant. However, the reduction of the tension of an oil control ring leads to decrease in its followability to a cylinder wall surface, likely increasing oil consumption. Also, improvement in combustion efficiency by elevating the combustion temperature or by direct injection of a fuel into the combustion chamber of an engine leads to the degradation of a lubricating oil, so that the resultant oil sludge makes side rails stick to a spacer expander, wearing seating tabs of the spacer expander.

To reduce oil consumption, for example, JP 2003-286898 A proposes the reduction of the width of a pressure ring to 1.0 mm or less, and the width of a combined oil ring to 2.0 mm or less. Also, to prevent sticking with oil sludge, JP 2000-27995 A proposes the formation of a fluorine-containing, oil-repellent coating on a surface of the oil ring, the coating being formed by a sol-gel method from a metal alkoxide and fluoroalkyl-substituted metal alkoxide, in which part of alkoxyl groups are substituted by fluoroalkyl groups. Further, to suppress the wearing of seating tabs of a spacer expander, JP 56-66429 A proposes the soft-nitriding treatment of seating tabs, and WO 2005/040645 A proposes that a gas-nitrided layer containing an S phase having peaks at 2θ of 40° and 46° in X-ray diffraction with Cu—Kα is formed on seating tabs.

However, pursuing the reduction of tension inevitably encounters increase in oil consumption, making difficult the improvement of a combined oil ring without oil consumption increase.

OBJECT OF THE INVENTION

Accordingly, an object of the present invention is to provide a combined oil control ring having excellent wear resistance and sludge resistance with reduced oil consumption.

DISCLOSURE OF THE INVENTION

As a result of intensive research on the structures of side rails and a spacer expander constituting a combined oil control ring, which provide good stability, followability, sludge resistance, etc., the inventors have found that (a) the adjustment of the height of side rails and the height of seating tabs of the spacer expander in predetermined ranges can improve the followability of the combined oil control ring and extremely reduce oil consumption while keeping stability, and that (b) the adjustment of the height of a side-rail-supporting portion and the height of an intermediate portion in the spacer expander results in improved sludge resistance. The present invention has been completed based on such findings.

Thus, the first combined oil control ring of the present invention comprises a pair of circular side rails each having a gap, and a waved spacer expander longitudinally sandwiched by the side rails, which has seating tabs for pushing inner surfaces of the side rails on the inner side, the radial thickness $a_1$ of the side rail being 50-90% of the height $a_9$ of the spacer expander.

The second combined oil control ring of the present invention comprises a pair of circular side rails each having a gap, and a waved spacer expander longitudinally sandwiched by the side rails, which has seating tabs for pushing inner surfaces of the side rails on the inner side, the height $a_{10}$ of the seating tab being 23-60% of the height $a_9$ of the spacer expander.

In each combined oil control ring of the present invention, the spacer expander preferably has longitudinally projecting supporting portions for supporting the side rails on both outer sides.

The longitudinal width A of the supporting portion is preferably 0.07 mm or more. Also, the height B of the intermediate portion between the seating tab and the supporting portion is preferably 45% or less of the height $a_9$ of the spacer expander.

Each of the combined oil control rings of the present invention is preferably provided with Ni plating on the spacer expander and/or the side rails.

The side rail-pushing surface of each seating tab of the spacer expander is preferably provided with a nitride layer. When the nitride layer is formed, the entire surface of the spacer expander except for the side rail-pushing surfaces is preferably provided with Ni plating.

DESCRIPTION OF THE PREFERRED EMBODIMENTS

Figure 1:
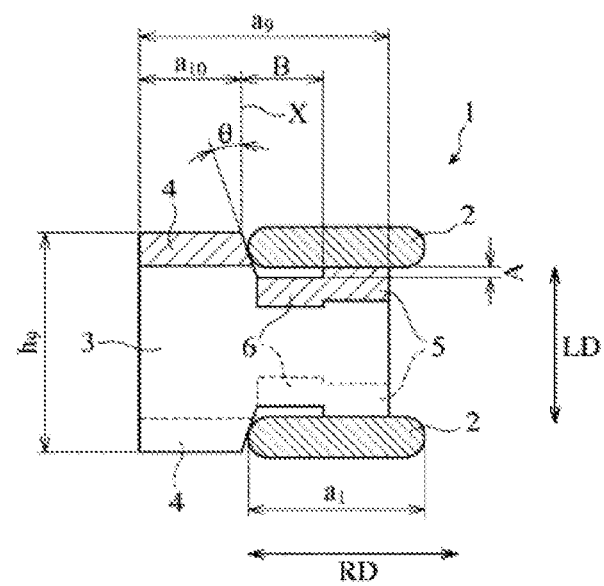
FIG. 1 is a cross-sectional view showing one example of the combined oil control rings of the present invention.

FIG. 1 shows one example of the combined oil rings of the present invention. In FIG. 1, the arrow LD is a longitudinal direction, and the arrow RD is a radial direction. The longitudinal direction LD is in parallel to the axis of a piston, and the radial direction RD is perpendicular to the axis of a piston. The longitudinal length is called "width," and the radial length is called "height," herein.

The combined oil ring 1 of the present invention comprises a pair of upper and lower circular side rails 2, 2 each having a gap, and a spacer expander 3 longitudinally supporting the side rails 2, 2. The spacer expander 3 has seating tabs 4 radially pushing inner surfaces of the side rails 2, 2 on the inner side, and if necessary, longitudinally projecting supporting portions 5 for supporting the side rails 2, 2 on both outer sides. When the supporting portions 5 are provided, a portion connecting each seating tab 4 to each supporting portion 5 is called an intermediate portion 6.

Figure 2:
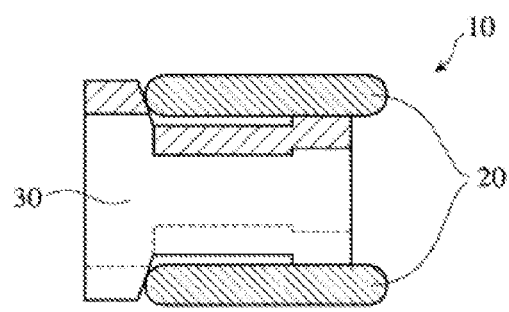
FIG. 2 is a cross-sectional view showing a conventional combined oil control ring.
Figure 3:
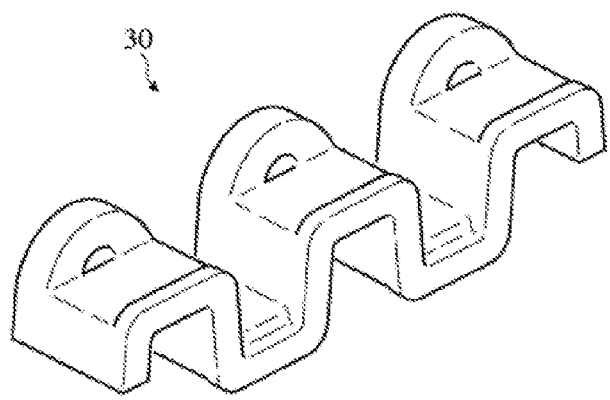
FIG. 3 is a perspective view showing part of a spacer expander constituting a conventional combined oil control ring.

FIG. 2 shows a conventional combined oil ring 10, and FIG. 3 shows part of a spacer expander 30 constituting the conventional oil ring. As is clear from the comparison of FIGS. 1 and 2, the combined oil ring 1 of the present invention has the same basic structure as that of the conventional combined oil ring 10, except that the combined oil ring 1 of the present invention has higher side rails 2, 2 with larger $a_1$ and higher seating tabs 4 of the spacer expander 3 with larger $a_{10}$ than those of the conventional oil ring 10.

In the first combined oil ring, the radial thickness $a_1$ of each side rail 2, 2 is 50-90% of the height $a_9$ of the spacer expander 3. When the radial thickness $a_1$ of the side rails 2, 2 is less than 50% of the height $a_9$ of the spacer expander, the side rails 2, 2 are not stably received in the ring groove of a piston, resulting in increased wearing of the ring groove. On the other hand, when it exceeds 90%, the radial thickness $a_1$ of the side rails 2, 2 is not sufficiently reduced for followability. The radial thickness $a_1$ of each side rail 2, 2 is preferably 50-85%, more preferably 55-81%, most preferably 60-76%, of the height $a_9$ of the spacer expander 3.

In the second combined oil ring, the height $a_{10}$ of the seating tab 4 is 23-60% of the height $a_9$ of the spacer expander. When the height $a_{10}$ of the seating tab 4 is less than 23% of the height $a_9$ of the spacer expander, the radial thickness $a_1$ of the side rails 2, 2 is not sufficiently reduced for followability. On the other hand, when it exceeds 60%, the radial thickness $a_1$ of the side rails 2, 2 is too small, so that the side rails 2, 2 are unstably seated in the ring groove, resulting in increased wearing of the ring groove of a piston. The height $a_{10}$ of the seating tab 4 is preferably 30-60%, more preferably 35-58%, most preferably 42-55%, of the height $a_9$ of the spacer expander.

Though the radial thickness $a_1$ of the side rails 2, 2 and the height $a_{10}$ of the seating tabs (4) are explained separately above, they are not independent parameters, but are in a relation that when the radial thickness $a_1$ of the side rails 2, 2 is determined, the height $a_{10}$ of the seating tab 4 is also determined, in the combined oil ring.

Because the outward inclined surfaces of the seating tabs 4 push the side rails 2, 2, the pressure of the seating tabs 4 to the side rails 2, 2 has a radial component toward the cylinder wall surface, and a longitudinal component toward the upper and lower surfaces of the ring groove. Accordingly, the side rails 2, 2 seal the cylinder wall surface and the upper and lower surfaces of the ring groove. From the aspect of sealing the upper and lower surfaces of the ring groove, the angle θ of the inclined surface (side rail-pushing surface) of the seating tab 4 is adjusted preferably in a range of 10-30°, more preferably in a range of 15-25°, from a longitudinal line X, because the radial thickness $a_1$ of the side rails 2, 2 is made smaller.

With respect to oil sludge not only causing the sticking of the combined oil ring but also drastically wearing the seating tabs 4 of the spacer expander 3 coming into sliding contact with the inner surfaces of the side rails 2, 2, it may be contemplated (a) to reduce the gap of a top ring to reduce the amount of a blowby gas, thereby suppressing the degradation of an engine oil, (b) to form a coating on the spacer expander and the side rails, thereby making the resultant sludge less attachable to the combined oil ring, and (c) to change the shape of the combined oil ring to make it unlikely for a flowing engine oil to reside on the combined oil ring. The oil sludge is likely accumulated particularly in a space between the flat intermediate portion 6 (between the seating tab 4 and the side rail-supporting portion 5) of the spacer expander 3 and the side rails 2, 2. To reduce the area in which an engine oil resides, and to provide a structure resistant to the accumulation of oil sludge, the longitudinal width A of the supporting portion 5 is preferably 0.07 mm or more, and the height B of the intermediate portion 6 is preferably 45% or less of the height $a_9$ of the spacer expander 3. A is more preferably 0.09 mm or more, most preferably 0.11 mm or more. Also, $B/a_9$ is more preferably 40% or less, most preferably 35% or less.

As measures against oil sludge, the formation of a hard nitride layer on the seating tabs 4 has been attempted. Particularly in the case of a low-tension combined oil ring, however, large variations of tension occur after nitriding, making it difficult to control the tolerance of tension. JP 2006-292021 A discloses a method for producing a spacer expander comprising plating a wire for the spacer expander with Ni, heat-treating the Ni-plated wire to lower the hardness of the Ni coating, plastically working the wire to form a spacer expander, forming seating tabs by local shearing such that a wire substrate is exposed only on a side rail-pushing surface of each seating tab, and subjecting the exposed substrate to a nitriding treatment to eliminate the unevenness of tension, in the present invention, too, the technology of JP 2006-292021 A is preferably utilized to form a nitride layer on the side rail-pushing surfaces of the seating tabs of the spacer expander, with the Ni plating remaining on the entire surface of the spacer expander except for the portions having the nitride layer.

The present invention will be explained in more detail referring to Examples below without intention of restricting the present invention thereto.

Example 1 and Comparative Example 1

Spacer expanders were formed from a rolled strip (SUS304) of 2.50 mm×0.25 mm in cross section with gears used, and side rails were formed from a rolled strip (SUS440B) of 1.60 mm×0.40 mm in cross section by coiling. The tension of the spacer expander was adjusted to a target value of 23 N by its development length.

Using the above spacer expanders and side rails, the combined oil rings of Example 1 and Comparative Example 1 having the sizes shown in Table 1 were produced.

TABLE 1

| Size | Example 1 | Com. Ex. 1 |
|---|---|---|
| Combined Oil Ring | | |
| Nominal diameter | 82.5 mm | 82.5 mm |
| Spacer Expander | | |
| Width $h_9$ | 2.43 mm | 2.43 mm |
| Height $a_9$ | 2.5 mm | 2.5 mm |
| Height $a_{10}$ of each seating tab | 1.2 mm | 0.5 mm |
| Longitudinal width A of supporting portion | 0.12 mm | 0.05 mm |
| Height B of each intermediate portion | 0.8 mm | 1.5 mm |
| Side Rail | | |
| Radial thickness $a_1$ | 1.6 mm | 2.3 mm |

The combined oil control rings of each of Example 1 and Comparative Example 1 were assembled in a commercially available four-cylinder gasoline engine having a displacement of 2400 cm³, and the engine was operated under a wide-open throttle (WOT) condition at 6,500 rpm for a predetermined period of time to measure oil consumption. Top rings and second rings assembled in each engine in advance were used. Assuming that the oil consumption in Comparative Example 1 was 100, the oil consumption in Example 1 was as small as 36, reduced to about ⅓.

Examples 2-5 and Comparative Example 2

Spacer expanders and side rails were formed from the same rolled strips SUS304 and SUS440B as in Example 1, to produce combined oil rings having the sizes shown in Table 2 with tension of 22 N. With respect to each combined oil ring, oil consumption was measured under the same conditions as in Example 1. These results are shown in Table 2 together with those of Example 1 and Comparative Example 1.

TABLE 2

| No.* | Spacer Expander (mm) $a_9^{(1)}$ | $a_{10}^{(2)}$ | $B^{(3)}$ | $a_1^{(4)}$ (mm) | $a_1/a_9$ | $a_{10}/a_9$ | $B/a_9$ | Oil Consumption |
|---|---|---|---|---|---|---|---|---|
| Example 1 | 2.5 | 1.2 | 0.8 | 1.6 | 0.64 | 0.48 | 0.32 | 36 |
| Example 2 | 2.5 | 0.6 | 1.4 | 2.2 | 0.88 | 0.24 | 0.52 | 79 |
| Example 3 | 2.5 | 0.9 | 1.1 | 1.9 | 0.76 | 0.36 | 0.44 | 61 |
| Example 4 | 2.5 | 1.3 | 0.7 | 1.5 | 0.60 | 0.52 | 0.28 | 31 |
| Example 5 | 2.5 | 1.5 | 0.5 | 1.3 | 0.52 | 0.60 | 0.20 | 21 |
| Com. Ex. 1 | 2.5 | 0.5 | 1.5 | 2.3 | 0.92 | 0.20 | 0.60 | 100 |
| Com. Ex. 2 | 2.5 | 1.6 | 0.4 | 1.2 | 0.48 | 0.64 | 0.16 | 26 |

Note:
(1) The height of the spacer expander.
(2) The height of each seating tab of the spacer expander.
(3) The height of each intermediate portion of the spacer expander.
(4) The radial thickness of the side rail.
*The longitudinal width A of the supporting portion was 0.12 mm in all of Examples 1-5 and Comparative Examples 1 and 2, except for 0.05 mm in Comparative Example 1.

The above results revealed that as the side rails became lower ($a_1/a_9$ became smaller), or the seating tabs of the spacer expander became higher ($a_{10}/a_9$ became larger), oil consumption was reduced. This appears to be due to the fact that a lower side rail increased the followability of the oil ring. Surprisingly, when the height of the side rails reached the level in Comparative Example 2, ring grooves were relatively roughened, so that oil consumption was not reduced despite increase in the followability.

Examples 6-8 and Comparative Example 3

The combined oil rings of each of Examples 1, 4, 5 and Comparative Example 2 were assembled in four pistons in the same engine as in Examples 1-5, and the engine was operated under a wide-open throttle (WOT) condition at 6,500 rpm for a predetermined period of time to measure how much the oil ring grooves of the pistons were worn. As in Examples 1-5, top rings and second rings attached to the pistons in advance were used. The amount of wear of the oil ring grooves was an average of the increment of the longitudinal widths of oil ring groove ends of four pistons before and after the test. The results are shown in Table 3.

TABLE 3

| No. | Combined Oil Rings Used | Wear of Oil Ring Grooves (μm) |
|---|---|---|
| Example 6 | Example 1 | 4 |
| Example 7 | Example 4 | 7 |
| Example 8 | Example 5 | 5 |
| Com. Ex. 3 | Com. Ex. 2 | 19 |

Examples 9-11 and Comparative Example 4

Each of the combined oil ring having the same sizes as in Example 1 (Example 9), the combined oil rings having the same sizes as in Example 1 except for changing the longitudinal width A of the supporting portion to 0.10 mm and 0.08 mm, respectively (Examples 10 and 11), and the combined oil ring having the same sizes as in Comparative Example 1 (Comparative Example 4) was assembled in each piston in the same engine as in Example 1, which comprised top rings and second rings in advance. Using a degraded engine oil which was commercially collected, the engine was operated for a predetermined period of time, under a cyclic condition continuously repeating a cycle of changing the rotation speed between a stop state and the maximum power, and a cycle of changing the temperatures of the engine oil and cooling water between low temperatures and high temperatures. Thereafter, each combined oil ring was slowly taken out of the piston, and subjected to ultrasonic washing in acetone to measure the amount of sludge accumulated on (strongly attached to) each combined oil ring. The amount of accumulated sludge was determined from the weight difference before and after the test. The measurement results are shown in Table 4 as relative values, assuming that the value of Comparative Example 4 was 100. It was confirmed from the results of Examples 9-11 that the amount of accumulated sludge decreased as the longitudinal width A of the supporting portion increased.

TABLE 4

| No. | Longitudinal Width A of Supporting Portion (mm) | Amount of Accumulated Sludge |
|---|---|---|
| Example 9 | 0.12 | 39 |
| Example 10 | 0.10 | 54 |
| Example 11 | 0.08 | 62 |
| Com. Ex. 4 | 0.05 | 100 |

Examples 12-14 and Comparative Example 5

Using the combined oil rings having the same sizes as in Examples 1-3 and Comparative Example 1, the same sludge accumulation test as in Examples 9-11 and Comparative Example 4 was conducted to measure the amount of sludge accumulated on each combined oil ring, fop rings and second rings attached assembled in each engine in advance were used. The measured amounts of accumulated sludge are shown in Table 5 as relative values, assuming that the value of Comparative Example 5 was 100. The longitudinal width A of the supporting portion was 0.12 mm in Examples 12-14, and 0.05 mm in Comparative Example 5.

TABLE 5

| No. | $B/a_9$ | Amount of Accumulated Sludge |
|---|---|---|
| Example 12 | 0.32 | 41 |
| Example 13 | 0.56 | 78 |
| Example 14 | 0.44 | 44 |
| Com. Ex. 5 | 0.60 | 100 |

Example 15 and Comparative Example 6

A rolled strip of SUS304 of 2.2 mm×0.275 mm in cross section was provided with Ni plating as thick as 6 μm, and then heat-treated at 500° C. for 1 hour. This strip was formed into spacer expanders with gears. Also, a rolled strip (SWRH82A) of 1.50 mm×0.35 mm in cross section was formed into side rails by coiling.

The side rail-pushing surfaces of seating tabs, in which the substrate was exposed by shearing by forming with gears, in the spacer expander were subjected to a gas-nitriding treatment at 570° C. for 80 minutes, to form a nitride layer having a thickness of about 30 μm and Vickers hardness Hv of 1300. Ni plating remaining on other surfaces than the side rail-pushing surfaces acted as a nitriding-preventing coating. Accordingly, increase in the development length of the spacer expander due to the nitriding treatment was suppressed, resulting in a spacer expander having as low tension as adjusted to 9 N.

Using the above spacer expanders and side rails, the combined oil rings of Example 15 and Comparative Example 6 having the sizes shown in Table 6 were produced.

TABLE 6

| Size | Example 15 | Com. Ex. 6 |
|---|---|---|
| Combined Oil Ring | | |
| Nominal diameter | 75.0 mm | 75.0 mm |
| Spacer Expander | | |
| Width $h_9$ | 2.0 mm | 2.0 mm |
| Height $a_9$ | 2.2 mm | 2.2 mm |
| Height $a_{10}$ of each seating tab | 1.1 mm | 0.5 mm |
| Longitudinal width A of supporting portion | 0.12 mm | 0.05 mm |
| Height B of each intermediate portion | 0.6 mm | 1.2 mm |
| Side Rail | | |
| Radial thickness $a_1$ | 1.5 mm | 2.0 mm |

The combined oil control rings of each of Example 15 and Comparative Example 6 were assembled in a commercially available four-cylinder gasoline engine having a displacement of 1500 cm$^3$, and the engine was operated under a wide-open throttle (WOT) condition at 6,000 rpm for a predetermined period of time, to measure oil consumption and the amount of sludge accumulated on each combined oil ring. Top rings and second rings assembled in each engine in advance were used. Assuming that the oil consumption in Comparative Example 6 was 100, the oil consumption in Example 15 was as small as 46, reduced to less than ½. Also, assuming that the amount of accumulated sludge in Comparative Example 6 was 100, the amount of accumulated sludge in Example 15 was 35, reduced to about ⅓.

Effects of the Invention

With a small ratio $(a_1/a_9)$ of the radial thickness $a_1$ of the side rails to the height $a_9$ of the spacer expander than in conventional combined oil rings, the combined oil ring of the present invention has extremely improved followability to a cylinder wall surface, enjoying drastically reduced oil consumption even with low tension. Also, because of a larger ratio $(a_{10}/a_9)$ of the height $a_{10}$ of the seating tabs to the height $a_9$ of the spacer expander than those of conventional combined oil rings, the spacer expander well sits in the ring groove, so that the combined oil ring of the present invention can be received in the ring groove of a piston with good balance, even though the side rails have small height.

When the spacer expander has a side rail-supporting portion, the relatively large longitudinal width A (0.07 mm or more) of the supporting portion makes it unlikely for an entering engine oil to reside on the combined oil ring, suppressing the accumulation of sludge, thereby preventing the sticking of the combined oil ring by sludge. Though oil sludge is likely accumulated between the intermediate portion and the side rail, a smaller height B of the intermediate portion than those of conventional combined oil rings makes an oil sludge-accumulating area smaller, resulting in decreased possibility of sticking the combined oil ring by oil sludge.

Further, the formation of a nitride layer on the seating tabs and a Ni plating layer on the entire surface of the spacer expander except for the seating tabs provides a combined oil ring with excellent wear resistance and sticking resistance as well as little tension unevenness, contributing to the improvement of combustion efficiency.

DESCRIPTION OF SYMBOLS

1 Combined oil control ring
2 Side rail
3 Spacer expander
4 Seating tab
5 Supporting portion
6 Intermediate portion
10 Conventional combined oil control ring
20 Conventional side rail
30 Conventional spacer expander

What is claimed is:

1. A combined oil control ring comprising:
a pair of circular side rails each having a gap; and
a waved spacer expander longitudinally sandwiched by said side rails, which has seating tabs for pushing inner surfaces of said side rails on an inner side, longitudinal projecting supporting portions for supporting the side rails, each of which projects in a longitudinal direction from the spacer expander, and recessed flat intermediate portions, a radial thickness $a_1$ of said side rail being 50-90% of a height $a_9$ of said spacer expander, a longitudinal width A of said projecting supporting portion being 0.07-0.12 mm, and a height B of said recessed flat intermediate portion being 20-45% of the height $a_9$ of said spacer expander, wherein
each of said recessed flat intermediate portions is positioned in a radial direction between said seating tab and said projecting supporting portion,
the radial thickness $a_1$ is from inner diameter to outer diameter of the side rail,
the height $a_9$ is from inner diameter to outer diameter of the waved spacer expander,
the longitudinal width A is from a surface of the recessed flat intermediate portion to an upper surface of the projecting supporting portion, and
the height B of the recessed flat intermediate portion is from an outer edge of the seating tab to an inner edge of the projecting supporting portion.

2. The combined oil control ring according to claim 1, wherein at least one of said spacer expander and said side rails are provided with Ni plating.

3. The combined oil control ring according to claim 1, wherein side rail-pushing surfaces of said seating tabs are provided with a nitride layer.

4. The combined oil control ring according to claim 3, wherein the entire surface of said spacer expander except for the portions having said nitride layer is provided with Ni plating.

5. A combined oil control ring comprising:

a pair of circular side rails each having a gap; and a waved spacer expander longitudinally sandwiched by said side rails, which has seating tabs for pushing inner surfaces of said side rails on an inner side, longitudinal projecting supporting portions for supporting the side rails, each of which projects in a longitudinal direction from the spacer expander, and recessed flat intermediate portions, a height $a_{10}$ of said seating tab being 23-60% of a height $a_9$ of said spacer expander, a longitudinal width A of said projecting supporting portion being 0.07-0.12 mm, and a height B of said recessed flat intermediate portion being 20-45% of the height $a_9$ of said spacer expander, wherein each of said recessed flat intermediate portions is positioned in a radial direction between said seating tab and said projecting supporting portion, the height $a_{10}$ of said seating tab is an inner edge to an outer edge of an upper most surface of the seating tab, the height $a_9$ is from inner diameter to outer diameter of the waved spacer expander, the longitudinal width A is from a surface of the recessed flat intermediate portion to an upper surface of the projecting supporting portion, and the height B of the recessed flat intermediate portion is from an outer edge of the seating tab to an inner edge of the projecting supporting portion.

6. The combined oil control ring according to claim 5, wherein at least one of said spacer expander and said side rails are provided with Ni plating.

7. The combined oil control ring according to claim 5, wherein the side rail-pushing surfaces of said seating tabs are provided with a nitride layer.

8. The combined oil control ring according to claim 7, wherein the entire surface of said spacer expander except for the portions having said nitride layer is provided with Ni plating.

* * * * *